United States Patent
Choi et al.

(10) Patent No.: US 7,664,503 B2
(45) Date of Patent: Feb. 16, 2010

(54) METHOD FOR MULTIMEDIA BROADCAST/MULTICAST SERVICE SIGNALING BEARER CONNECTION ON IU INTERFACE

(75) Inventors: Sung-Ho Choi, Suwon-si (KR); Kook-Heui Lee, Yongin-si (KR); Qinghai Gao, Beijing (CN); Detao Li, Beijing (CN); Lixiang Xu, Beijing (CH)

(73) Assignees: Samsung Electronics Co., Ltd (KR); Beijing Samsung Telecom R&D Center, Beijing (CN)

( * ) Notice: Subject to any disclaimer, the term of this patent is extended or adjusted under 35 U.S.C. 154(b) by 754 days.

(21) Appl. No.: 10/533,690

(22) PCT Filed: Nov. 5, 2003

(86) PCT No.: PCT/KR03/02355

§ 371 (c)(1),
(2), (4) Date: Dec. 1, 2005

(87) PCT Pub. No.: WO2004/043021

PCT Pub. Date: May 21, 2004

(65) Prior Publication Data

US 2006/0140159 A1    Jun. 29, 2006

(30) Foreign Application Priority Data

Nov. 5, 2002   (CN)  ................................ 02 1 50342

(51) Int. Cl.
*H04W 40/00*    (2009.01)
(52) U.S. Cl. ..................... 455/445; 455/428; 455/560; 370/328

(58) Field of Classification Search ................. 370/328, 370/336, 337, 347, 352–356, 569, 401, 338; 455/403, 422.1, 428, 445, 560–561
See application file for complete search history.

(56) References Cited

U.S. PATENT DOCUMENTS 5,673,265 A    9/1997   Gupta et al.

(Continued)

FOREIGN PATENT DOCUMENTS

JP    2004-153804    5/2004

OTHER PUBLICATIONS

3rd Generation Partnership Project; Technical Specification Group Services and System Aspects; Multimedia Broadcast/Multicast Service; Architecture and Functional Description, Sep. 2002.

(Continued)

*Primary Examiner*—Kamran Afshar
(74) *Attorney, Agent, or Firm*—The Farrell Law Firm, LLP

(57) ABSTRACT

A method of signaling bearer connection on Iu interface for MBMS service, includes the following steps: (a) RNC receives a MBMS Notification message for a certain MBMS service from SGSN; (b) RNC constructs a MBMS Service Request message according to the contents of the notification; (c) RNC sends a SCCP Connection Request message to SGSN, requests to establish a SCCP signaling connection, and then waits for a reply; (d) RNC receives a SCCP Connection Confirmation message from SGSN. This invention solves the problem of signaling connection on Iu interface after MBMS service is introduced into the existing mobile communication system. The connection mode provided in this invention can reasonably utilize network resources, effectively reduce signaling congestion on Iu interface and reduce modifications to the existing Iu interface message.

38 Claims, 8 Drawing Sheets

U.S. PATENT DOCUMENTS

| | | | |
|---|---|---|---|
| 5,740,176 A | | 4/1998 | Gupta et al. |
| 5,864,542 A | | 1/1999 | Gupta et al. |
| 7,400,593 B2 | * | 7/2008 | Choi et al. .................. 370/338 |
| 7,554,940 B2 | * | 6/2009 | Kawaguchi et al. .......... 370/328 |
| 2003/0169725 A1 | * | 9/2003 | Ahmavaara et al. .......... 370/352 |
| 2004/0102212 A1 | * | 5/2004 | Sarkkinen et al. .......... 455/552.1 |
| 2004/0147262 A1 | * | 7/2004 | Lescuyer et al. ............. 455/434 |
| 2005/0157673 A1 | * | 7/2005 | Verma et al. ................. 370/328 |

OTHER PUBLICATIONS

AD-HOC on MBMS RNC Signallling Flows, Sep. 23, 2002.

Lucent Technologies: Revised Proposal Text on Impact of IUR on MBMS IU Bearer Selection, Jun. 24, 2002.

Ericsson: Utran Architectural Aspects in Relation With MBMS, May 24, 2002.

Holma et al., WDCMA for UMTS, Radio Access for Third Generation Mobile Communications, 2001.

Samsung, Sharing IU Control Bearer for MBMS, Discussion and Decision, Sep. 23-27, 2002.

* cited by examiner

METHOD FOR MULTIMEDIA BROADCAST/MULTICAST SERVICE SIGNALING BEARER CONNECTION ON IU INTERFACE

PRIORITY

This application claims priority under 35 U.S.C. § 119(a) to Chinese Patent Application filed in the State Intellectual Property Office of China on Nov. 5, 2002 and assigned Serial No. 02150342.7, and under 35 U.S.C. § 120 to PCT Application No. PCT/KR2003/002355 filed on Nov. 5, 2003, the content of both of which are incorporated herein by reference.

BACKGROUND OF THE INVENTION

1. Field of the Invention

This invention relates to Multimedia Broadcast/Multicast Service in Wideband Code Division Multiple Access (hereinafter referred to as WCDMA) mobile communication system, more specifically relates to a method for signaling bearer connection of Multimedia Broadcast/Multicast Service on Iu interface (the interface between Radio Access Network and Core Network).

2. Description of the Prior Art

Multimedia Broadcast and Multicast Service (hereinafter referred to as MBMS) is a new service under standardization by $3^{rd}$ Generation Partnership Project (hereinafter referred to as 3GPP). MBMS service is an unidirectional point-to-multipoint (p-t-m) service, whose most remarkable characteristic is that it can make use of radio resources and network resources efficiently.

The architecture of the MBMS system is described in brief in combination with FIG. 1.

MBMS network structure adds new network elements based on the core network of General Packet Radio Service (hereinafter referred to as GPRS). Broadcast and Multicast Service center 101 (hereinafter referred to as BM-SC) is the service control center of MBMS system. Gateway GPRS Supporting Node 102 (hereinafter referred to as GGSN) and Service GPRS Supporting Node 103 (hereinafter referred to as SGSN) constitute the transmission network of MBMS service and provide route for data transfer. Home Location Register 106 (hereinafter referred to as HLR) saves the data related to user and can provide services such as user's authentication or the like. UMTS Terrestrial Radio Access Network 104 (hereinafter referred to as UTRAN) provides radio resources for MBMS service over the air-interface. Iu 107 indicates the interface between Radio Access Network and Core Network. User Equipment 105 (hereinafter referred to as UE) is the terminal device for receiving data. Radio resources used by MBMS service are not dedicated for one user, but are shared by all users using this service.

(1) Signaling Connection Mode of the Existing Iu Interface

In order to transfer message of layer 3 between UE and CN, the existing Radio Access Network Application Part (hereinafter referred to RANAP) establishes a signaling connection for each activated UE. RANAP supports two modes, i.e. connection-oriented and connectionless-oriented.

(2) Signaling Connection Establishment and Release of the Existing Iu Interface

When information of UE and CN needs to be exchanged between Radio Network Controller (hereinafter referred to as RNC) and CN and there is no signaling connection control part (hereinafter referred to as SCCP) for this UE on Iu interface, it is started to establish a new SCCP connection. The establishment of SCCP connection is as follows:

I) RNC Initiates the Establishment of SCCP Signaling Connection;

When RNC receives a non-MAC (Media Access Control) message from UE for the first time and there is no Iu connection for this UE, RNC initiates the procedure of SCCP connection establishment. RNC sends a SCCP Connection Request message to CN, which includes a RANAP message in its data field.

II) CN Initiates the Establishment of SCCP Signaling Connection

CN initiates the establishment of SCCP signaling connection when executing relocation. CN initiates the establishment of Iu connection through sending a SCCP Connection Request message to RNC, which includes a RANAP message in its data field (optional).

Situations listed above are only those for SCCP connection establishment having been decided at present. And other situation will be introduced in the future.

On the occasion of normal release, the release of SCCP connection is initiated by CN. When CN finds that a signaling connection isn't needed any more, the connection will be released and CN sends a SCCP RELEASED message.

On the occasion of abnormal; both CN and RNC can initiate a release procedure.

(3) The Existing Relocation Procedure of Serving Radio Network Subsystem

The SRNS relocation procedure is described by 3GPP specification TR 23.846 v1.2.0. FIG. 2 shows the corresponding signaling flow. The detailed description for each step in the flow is as follows.

201 Source RNC decides to execute SRNS relocation procedure;

202 Source RNC sends a Relocation Demand message to the old SGSN;

203 The old SGSN forwards the Relocation Demand message to the new SGSN;

204 The new SGSN sends a Relocation Request message to the target RNC and a radio access bearer (hereinafter referred to as RAB) is established between the target RNC and the new SGSN. After the resources needed by RAB including resources of the user plane are successfully allocated,: the target RNC sends a Relocation Request Confirmation message to the new SGSN.

205 The new SGSN forwards a Relocation Response message to the old SGSN.

206 The old SGSN sends a Relocation Command message to the source RNC.

207 The source RNC starts to copy data and sends them to the target RNC through network protocol (hereinafter referred to as IP layer).

208 The source RNC sends a Relocation delivery message to the target RNC. This procedure is used to transmit SRNS Context to the target RNC and the role of SRNS converts from the source RNC to the target RNC.

209 When the target RNC receives the trigger message for relocation execution, it sends a Relocation Detecting message to the new SGSN. After that the target RNC starts to play the role of Serving Radio Network Controller (hereinafter referred to as SRNC).

210 The UE exchanges mobility related information with the target RNC, such as the new SRNC Identifier, the representation of location area and uplink user data exchanging between UE and the target RNC, etc.

211 If the SRNS relocation is a relocation occurring between different SGSNs, the new SGSN sends a Update PDP Context Request message to the corresponding GGSN after it receives the Relocation Detecting message. GGSN updates Packet Data Protocol (hereinafter referred to as PDP) context and returns back a Update PDP Context Response message. The new SGSN examines respective MBMS services in NBMS Context of UE. IF a certain service is joined by the first UE in SGSN, a GPRS Tunnel Protocol (hereinafter referred to as GTP) tunnel between SGSN and GGSN is established and MBMS Context is created in GGSN.

212 The target SRNC initiates a Relocation completion procedure after receiving a UTRAN Mobility Information Confirmation message. The new SGSN sends a Relocation completion message to notify the old SGSN of the completion of SRNS relocation procedure.

213 Release the Iu connection between the source RNC and the source SGSN and the user resources.

214 If the new Route Area Indication (hereinafter referred to as RAI) is different from that of the old, UE initiates a route location update procedure.

C1, C2 and C3 execute Customized Applications for Mobile network Enhanced Logic (hereinafter referred to as CAMEL).

Existing RANAP uses a signaling connection for each activated UE. MBMS service is a new point-to-multipoint service, whose feature is to make use of radio resources and network resources more efficiently through sharing; On Iu interface, the user plane of MBMS services is shared. If each UE uses one signaling connection, it will not only increase the traffic of the information on Iu interface and the processes on the RNC and SGSN side, but also be unable to solve completely the problem due to user mobility. In order to solve of the problem of user mobility, messages on the existing Iu interface need to be modified as well. Thus, a method for Iu interface connection oriented to MBMS service shall be proposed, which can not only make reasonable use of network resources, reduce processes on RNC and SGSN side and modifications to the existing message, but also can solve the problem of user mobility.

The existing Relocation Demand message is connection-oriented. If an user does not have other services (e.g. voice) except for receiving MBMS service, the Iu connection dedicated to the user has not been established. How to send a relocation demand message or establish Iu connection dedicated for the UE is the problem to be solved.

Since the user plane of MBMS service on Iu interface is shared, while the user plain and control plane of other services are dedicated, SRNS relocation procedure needs to be modified in this new mode;

Besides the connection method proposed in this invention (shared signaling connection is used on Iu for the same kind of MBMS service, and at the same time, dedicated Iu connection is established for the case in which other services besides MBMS service are received and the mobility of the UE occurs), there is another proposal that only shared Iu connection exists on Iu interface for UEs receiving MBMS. With respect to both these cases in which shared Iu connection exists, the method for establishing and releasing MBMS shared connection hasn't been provided in the existing SCCP connection establish procedure, and the situation for establishing shared connection shall be added to the conditions for establishing SCCP connection. Since MBMS is a new-introduced service, when the shared connection used for MBMS service shall be released is a problem unsolved in present specification.

SUMMARY OF THE INVENTION

The object of this invention is to provide a new method for establishing a shared Iu signaling connection for the same kind of MBMS service.

In order to realize above object, according to one aspect of this invention, a method of signaling bearer connection on Iu interface for MBMS service is provided, in which RNC establishes the shared signaling bearer for MBMS service on Iu interface, the method includes the following steps:
(a) RNC receives a MBMS Notification message for a certain MBMS service from SGSN;
(b) RNC constructs a MBMS Service Request message according to the contents of the notification;
(c) RNC sends a SCCP Connection Request message to SGSN, requests to establish a SCCP signaling connection, and then waits for a reply;
RNC receives a SCCP Connection Confirmation message from SGSN, which indicates the success of shared Iu signaling connection establishment for this service.

According to another aspect of this invention, a method of signaling bearer connection on Iu interface for MBMS service is provided, in which SGSN establishes the shared signaling bearer for MBMS service, the method includes the following steps:
a) SGSN sends a MBMS Notification message to Radio Network Controller (RNC) after receiving the data sent from GGSN, notifies of relevant MBMS service information, and then waits for the response message from RNC;
b) After receiving a SCCP Connection Request message from RNC, SGSN separates the RANAP message included in the data fields, saves the Iu signaling connection ID allocated by RNC for this service; allocates the identifier of the signaling connection in SGSN, and then constructs a SCCP Connection Confirmation message and a MBMS RAB Assignment Request message;
c) SGSN sends a SCCP Connection Confirmation message to RNC;
SGSN sends a MBMS RAB Assignment Request message to RNC via the shared Iu connection established. If the MBMS RAB Assignment Request message is included in the data field of the SCCP Connection Confirmation message, this step can be omitted.

According to another aspect of this invention, a method of signaling bearer connection on Iu interface for MBMS service is provided, in which SGSN establishes the shared signaling bearer for MBMS service on Iu interface, the method includes the following steps:
a) SGSN receives MBMS data from GGSN;
b) SGSN analyzes the service to be performed. If there is no shared Iu connection for this service; it organizes a SCCP Connection Request message, whose data fields include a MBMS RAB Assignment Request message.
c) SGSN sends a SCCP Connection Request to RNC, requests to establish SCCP signaling connection, and then waits for a reply;
SGSN receives a SCCP Connection Confirmation message from RNC, which indicates the success of the shared Iu signaling connection establishment for this service.

According to still another aspect of this invention, a method of signaling bearer connection on Iu interface for MBMS service is provided, in which RNC establishes the shared signaling bearer for MBMS service on Iu interface, the method includes the following steps:
a) After receiving a SCCP Connection Request message from SGSN, RNC separates the RANAP message included in the data fields, saves the Iu signaling connection ID allocated by SGSN for this service; allocates the identifier of the signaling connection in RNC, and then constructs a SCCP Connection Confirmation Message and MBMS RAB Assignment Response message;

b) RNC sends a SCCP Connection Confirmation message to SGSN;

c) RNC sends a MBMS RAB Assignment Response message to SGSN via the shared Iu connection established. If the MBMS RAB Assignment Response message is not included in the data field of the SCCP Connection Confirmation message, this step can be omitted;

This invention solves the problem of signaling connection on Iu interface after MBMS service is introduced into the existing mobile communication system.

1. The connection mode given in this invention can reasonably utilize network resources, reduce effectively signaling congestion on Iu interface, and reduce modifications to the existing Iu interface message.
2. Through modifying the SRNS relocation flow, it solves the problem due to user mobility in the case of introducing the MBMS service. These modifications have no effect on the existing relocation procedure and keep afterward compatibility.
3. It provides an establish and release mechanism for shared Iu connection, thereby to guarantee the feasibility of the existence of shared connection.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
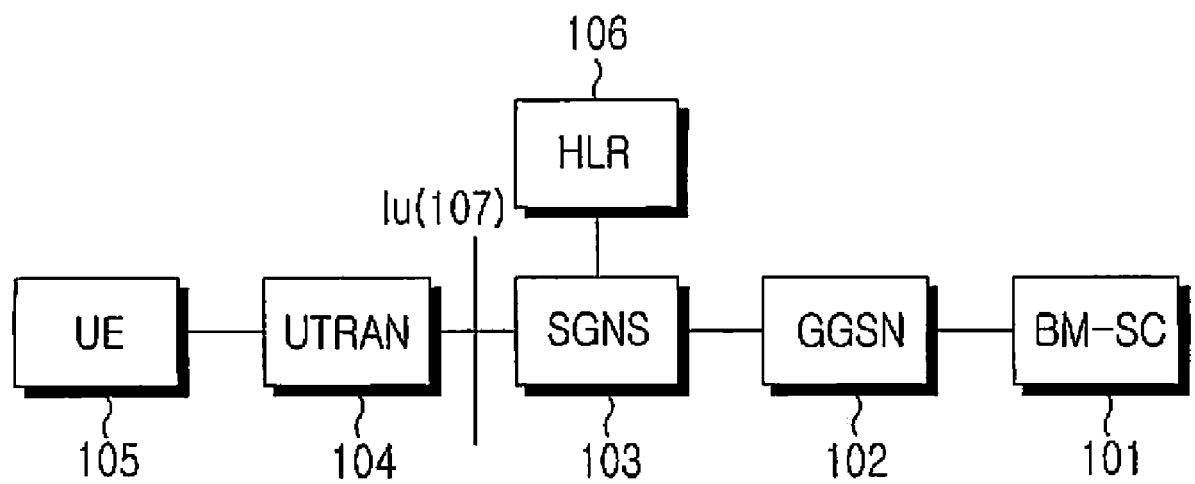
FIG. 1 schematically illustrates MBMS system configuration.
Figure 2:
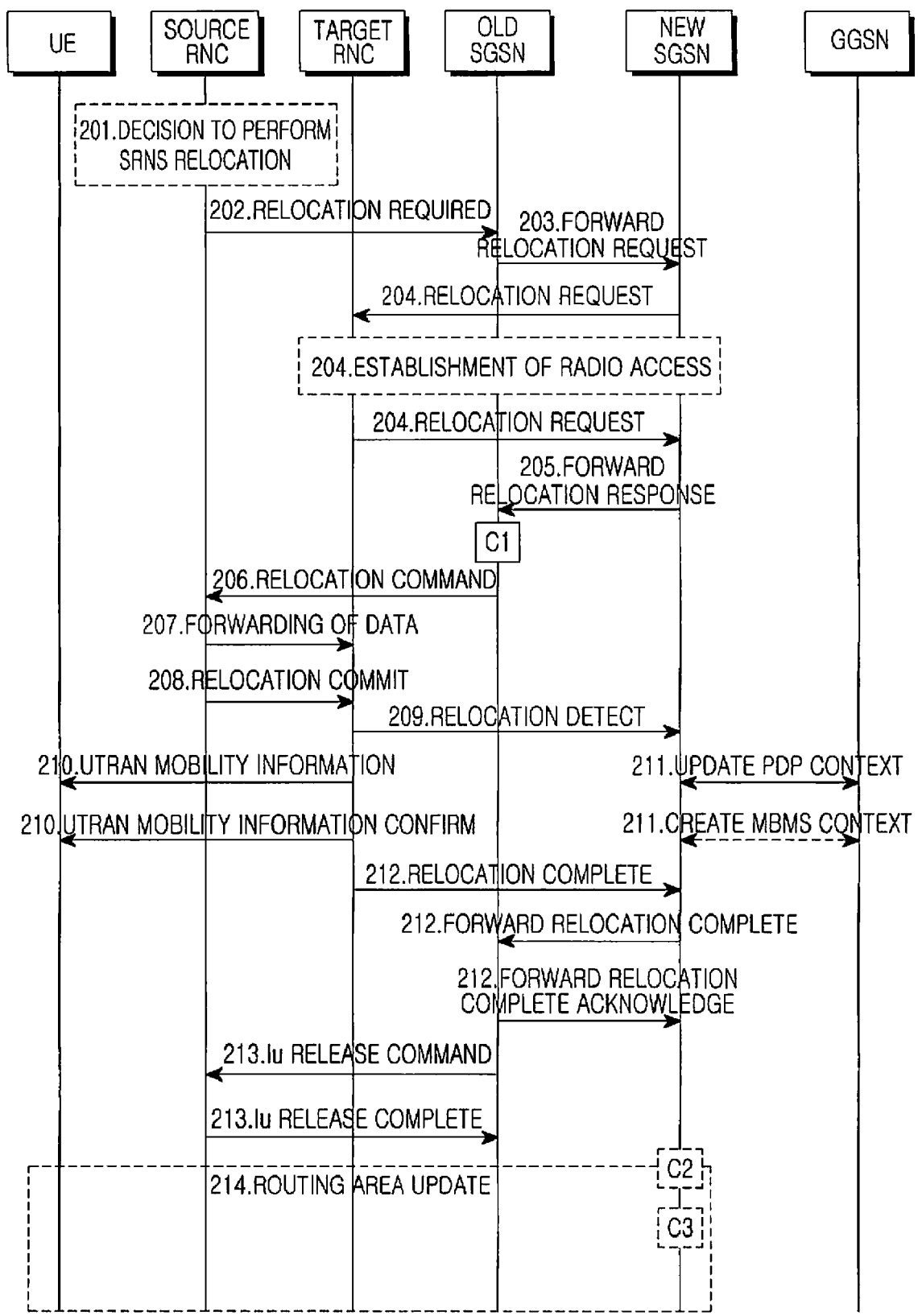
FIG. 2 shows the procedure of the existing SRNS relocation.

In order to provide a reasonable Iu connection mode for MBMS service, this invention makes modification and innovation for the existing technology in follow several aspects:

The use of a shared Iu signaling connection for the same kind of MBMS service is proposed, and a UE dedicated Iu signaling connection is established if UE receives other services besides MBMS service or moves. Those messages providing services for MBMS are sent through the shared Iu connection. The identical messages for the same kind of service needn't be sent repeatedly at the same time, thereby to make use of network resources reasonably. A dedicated Iu connection is used for other non-MBMS service or for a user's mobility, which can reduce modifications to the existing messages.

The problem of how to send a Relocation Demand message on occasion that user only receives MBMS service is solved.

A new situation is added to the trigger conditions of the existing SCCP connection establishment: when RNC sends a Relocation Request message to SGSN, if there is no Iu connection for this UE on Iu interface, a SCCP connection establishment procedure is initiated.

Modification to the relocation procedure

In order to solve the problem due to the user mobility after introducing MBMS, some messages are added to the SRNS relocation flow, thereby to solve completely the relocation problem when the user plane is shared and the control plane employs this new Iu connection mode.

Conditions for establishing shared connection for MBMS service are added to the existing SCCP connection establishment conditions.

A new situation is added to the trigger condition of the existing SCCP connection establishment as follows: when RNC sends a MBMS Service Request to SGSN or SGSN sends a MBMS RAB Assignment Request message to RNC, if there is no Iu connection used for this UE on Iu interface, SCCP connection establishment procedure is initiated. The establishment procedures is applicable not only to the case of the coexistence of both the shared and dedicated Iu connection, but also to the case of the existence of only the shared Iu connection.

MBMS shared connection release: when data transmission finishes or no UE uses MBMS service between RNC and SGSN, both RNC and SGSN can initiate an Iu connection release procedure.

(1) Signaling Connection mode on Iu Interface

Messages used for MBMS on Iu interface are oriented to a service such as MBMS Notification, MBMS Service Request/Deletion, MBMS RAB Establishment, etc, but not to a UE. Thus, it is proposed to use a shared Iu connection for the same kind of MBMS service on Iu interface. Messages for the MBMS service can be sent via the shared Iu connection. It is unnecessary to send messages for multiple UE repeatedly on Iu interface at one time, thereby to reduce information traffic on Iu interface and thus to avoid that RNC/SGSN receives multiple the same messages from the connections serving for different UEs at the same time, which can reduce the processing on the RNC and SGSN side.

In addition, the user can also receive other services (e.g. voice) while receiving MBMS service, and the mobility of each user is independent. Messages used by the Iu interface in the existing SRNS relocation flow are connection-oriented messages for the UE. In order to reduce modifications to the existing messages and to the existing SRNS relocation flow at the same time, which makes the system keep backward compatibility, it is necessary to establish a dedicated Iu connection for the UE to control user plane resources of other service or user mobility if the user uses other services (e.g. voice) besides MBMS service or moves.

(2) SRNS Relocation Procedure

In order to accomplish the SRNS relocation procedure, this invention makes the following modifications and innovations:

a) The Relocation Demand message is connection-oriented. If the user who has moved receives no services other than MBMS service and the Iu connection-dedicated for UE hasn't been established. At this time, a temporary Iu dedicated connection needs to be established. So a new situation is added to the trigger conditions of the existing SCCP connection establishment, which is described as follows:

The situations of SCCP connection establishment are as follows:

I) RNC Initiates the Establishment of SCCP Signaling Connection

When RNC receives a non-MAC (Media Access Control) message from UE for the first time and there is no Iu connection for this UE, RNC initiates the procedure of SCCP connection establishment. RNC sends a SCCP Connection Request message which includes a RANAP message in its data field to CN.

When RNC sends a Relocation Demand message to the source SGSN, if there is no Iu connection used for this UE on Iu interface, RNC initiates a SCCP connection establishment procedure. A RANAP message is included in the data field of the SCCP Connection Establishment Request message.

II) CN Initiates the Establishment of SCCP Signaling Connection

CN initiates the establishment of SCCP signaling connection when executing relocation. CN initiates the establishment of Iu connection through sending a SCCP Connection Request message which includes a RANAP message (optional) in its data field to RNC.

b) In order to make the target RNC get known the situation of MBMS service used by the UE, an information element, i.e. MBMS Context List, is added to the existing Relocation Request message. MBMS Context mainly includes APN, IP Address and Qos.

c) After the target RNC receives a Relocation Request message, if it finds that it hasn't received a certain MBMS service that is requested by UE at present, it sends a MBMS Service Request message to the new SGSN. The new SGSN can establish RAB for the corresponding MBMS service at the same time when it establishes RAB; and sends MBMS data to the new RNC. This is a new step added by this invention.

d) Functions with 14 steps are added. When RNC receives a Iu Release Command message, which indicates the completion of SRNS relocation procedure. If the UE that has moved is the last user of the source RNC, Both the shared connection and the user plane resources corresponding to MBMS service shall be released. Three schemes can be selected for this function. The following schemes are also applicable to the situation that the last user between RNC and SGSN quits the service or other situation that shared Iu connection needs to be released.

Scheme 1) The function is initiated by RNC and implemented by the existing messages.

RNC sends a Iu Release Request message to SGSN and requests SGSN to release corresponding Iu connection and the user plane resources;

SGSN sends a Iu Release Command message to the source RNC;

The source RNC releases corresponding resources and sends a Iu Release Completion message to SGSN.

Scheme 2) The function is initiated by RNC and implemented by adding a new message.

RNC releases the user plane resources and the Iu connection, and then sends a MBMS Iu Release Indication message to the old SGSN. This new message is a connection-oriented message, which mainly includes the following several information elements:

RABs Data Volume Report List

It mainly includes two parts:

RAB Identifier (RAB ID)

RAB data volume report items, e.g. downlink data volume that haven't been successfully sent and data volume reference.

RABs Released List

Main contents include:

RAB Identifier (RAB ID)

The sequence number of downlink Protocol Data Unit (PDU)

The sequence number of uplink PDU

Scheme 3) The function is initiated by SGSN and implemented by the existing messages.

If SGSN finds that the last user between it and RNC leaves or quits a certain MBMS service, it sends a Iu Release Command to, RNC. RNC releases the corresponding resources and sends a Iu Release Completion message to SGSN.

(3) The Establishment and Release of Iu Interface Shared Signaling Connection

In order to establish the shared Iu connection, two methods can solve this problem.

Method 1 is described as follows:

A new situation is added to the trigger conditions of the existing SCCP connection establishment, which is described as follows:

The situation of the SCCP connection establishment is as follows:

I) RNC Initiates the Establishment of SCCP Signaling Connection

When RNC receives a non-MAC (Media Access Control) message from UE for the first time and there is no Iu connection for this UE, RNC initiates the procedure of SCCP connection establishment. RNC sends a SCCP Connection Request message which includes a RANAP message in its data field to CN.

When RNC sends a Relocation Demand message to the source SGSN, if there is no Iu connection used for this UE on Iu interface, RNC initiates a SCCP connection establishment procedure. A Relocation Demand message is included in the data field of a SCCP Connection Establishment Request message.

When RNC sends a MBMS Service Request message to SGSN, if there is no Iu connection used for this UE on Iu interface, RNC initiates a SCCP connection establishment procedure. A RANAP message is included in the data field of the SCCP Connection Establishment Request message.

II) CN Initiates the Establishment of SCCP Signaling Connection

CN initiates the establishment of SCCP signaling connection when executing relocation. CN initiates the establishment of Iu connection through sending a SCCP Connection Request message which includes a RANAP message (optional) in its data field to RNC, Method 2 is described as follows:

A new situation is added to the trigger condition of the existing SCCP connection establishment, which is described as follows:

The situation of SCCP connection establishment is as follows:

III) RNC Initiates the Establishment of SCCP Signaling Connection

When RNC receives a non-MAC (Media Access Control) message from UE for the first time and there is no Iu connection for this UE; RNC initiates the procedure of SCCP connection establishment. RNC sends a SCCP Connection Request; message which includes a RANAP message in its data field to CN.

When RNC sends a Relocation Demand message to the source SGSN, if there is no Iu connection used for this UE on Iu interface, RNC initiates a SCCP connection establishment procedure. A Relocation Demand message is included in the data field of a SCCP Connection Establishment Request message.

IV) CN Initiates the Establishment of SCCP Signaling Connection

CN initiates the establishment of SCCP signaling connection when executing relocation. CN initiates the establishment of Iu connection through sending a SCCP Connection Request message which includes a RANAP message (optional) in its data field to RNC.

When SGSN sends a MBMS RAB Assignment Request message to RNC, if there is no Iu connection used for this UE on Iu interface, SQSN initiates a SCCP connection establishment procedure. A RANAP message is included in the data field of the SCCP Connection Establishment Request message.

On the occasion of normal release, the release of SCCP connection is initiated by CN. When CN finds that a signaling connection isn't needed any more, the connection will be released and CN sends a SCCP RELEASED message. On any abnormal occasion, both CN and RNC can initiate a release procedure.

The shared MBMS Iu connection can be released in the following two situations:

When SGSN won't receive MBMS data any more, a signaling connection and RAB release procedure can be initiated.

When no UE uses MBMS service between RNC and SGSN, both RNC and SGSN can initiate a Iu connection release procedure.

In the following, the flow of this invention will be described in detail by referring to attached figures.

(1) The Signaling Flow of MBMS Shared Iu Connection Establishment

Figure 3:
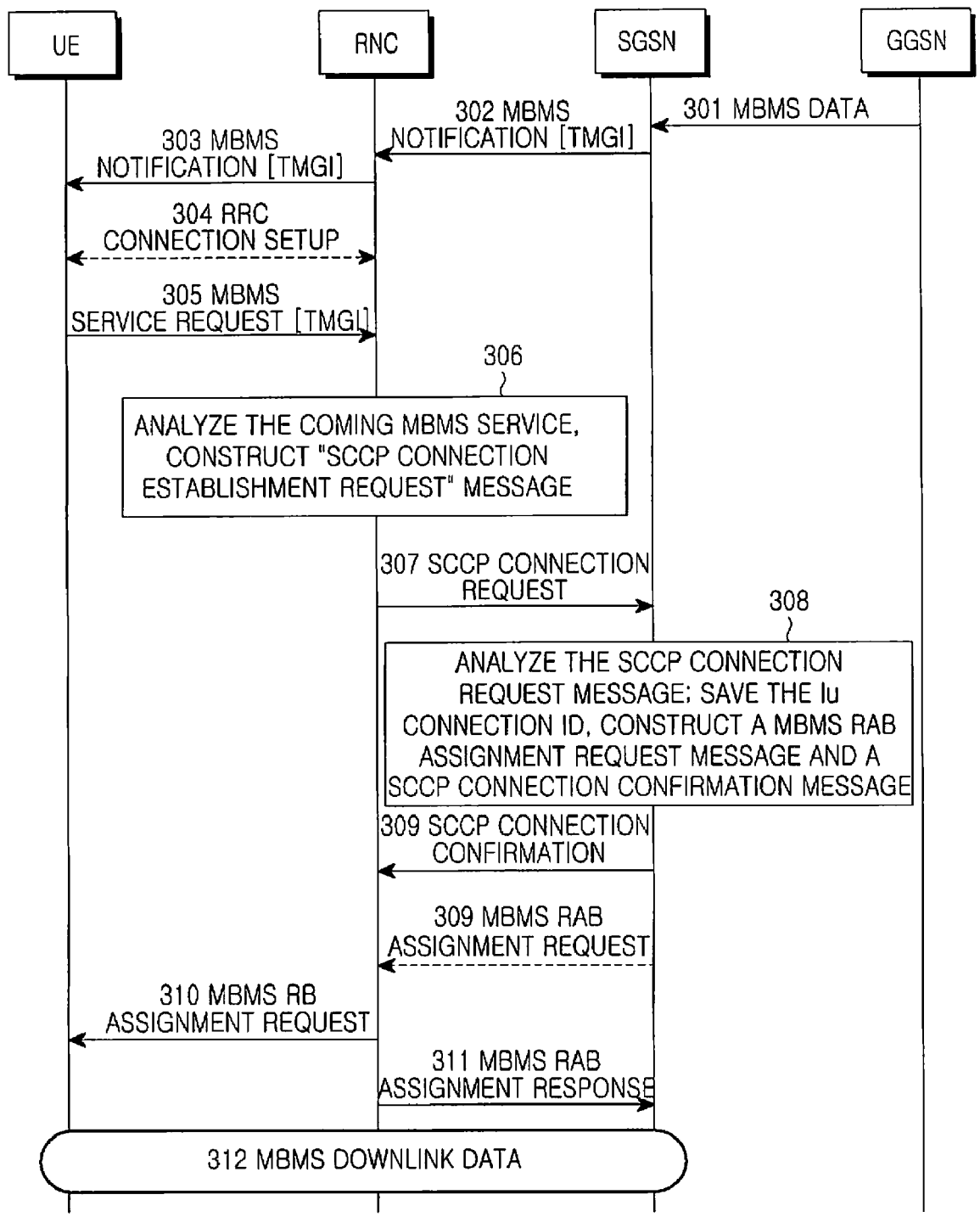
FIG. 3 shows the flow of the establishment of the shared Iu signaling connection for MBMS according to the first method of the invention.

Method 1 is described as follows:

FIG. 3 shows the signaling flow of MBMS shared Iu connection establishment initiated by RNC. The detailed description for each operation step is as follows.

301 GGSN sends data to SGSN.

302 SGSN constructs a MBMS Notification message, which is connectionless-oriented, the same as the existing paging message, and belongs to the notification service of RANAP, and send it to RNC.

303 RNC sends a MBMS Notification message to UE to notify UE of incoming MBMS service.

304 Establish a RRC connection for the UE in idle state.

305 UE sends a MBMS Service Request message to UTRAN.

306 RNC analyzes the on-going service. If there is no Iu connection used for this service, RNC constructs a SCCP Connection Request message.

307 RNC sends a SCCP Connection Request message which includes a MBMS Service Request message in its data field to SGSN.

308 SGSN analyzes the SCCP Connection Request message and save the Iu connection ID allocated by RNC; SGSN analyzes the service requested by RNC and constructs a MBMS RAB Assignment Request message and a SCCP Connection Confirmation message.

309 SGSN sends a SCCP Connection Confirmation message to RNC. SGSN can directly send a MBMS RAB Assignment Request which is a RANAP message to RNC, or make the MBMS RAB Assignment Request message to be included in the data field of SCCP Connection Confirmation. MBMS RAB Assignment Request is a connection-oriented message.

310 RB is established for the UE that receives MBMS service.

311 RNC sends a MBMS RAB Assignment Response message to SGSN via the shared Iu connection used for this service.

312 SGSN starts to send downlink data.

Figure 4:
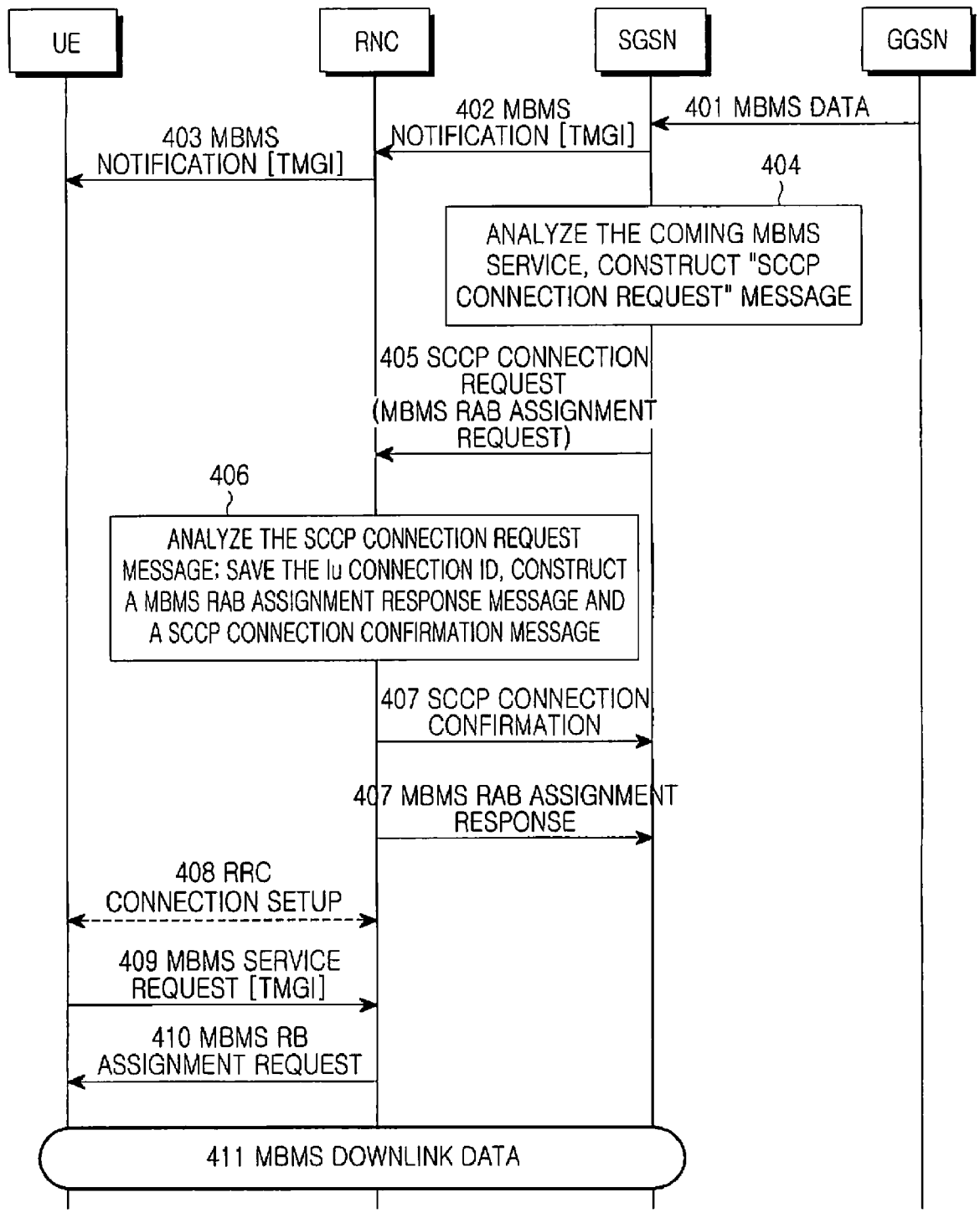
FIG. 4 shows the flow of the establishment of the shared Iu signaling connection for MBMS according to the second method of the invention.

Method 2 is described as follows:

FIG. 4 shows the signaling flow of the MBMS shared Iu connection establishment initiated by SGSN. The detailed description for each operation step is as follows.

401 GGSN sends data to SGSN.

402 SGSN constructs a MBMS Notification message which is connectionless-oriented, the same as the existing paging message, and belongs to the notification service of RANAP to RNC.

403 RNC sends a MBMS Notification message to UE to notify UE of incoming MBMS service.

404 RNC analyzes the on-going service. If there is no Iu connection used for this service, RNC constructs a SCCP Connection Request message; .

405 SGSN sends a SCCP Connection Request message which includes a MBMS RAB Assignment Request-message in its data field to RNC.

406 RNC analyzes the SCCP Connection Request message, saves the Iu connection ID allocated by SGSN, and constructs a MBMS RAB Assignment Response message and a SCCP Connection Confirmation message.

407 RNC sends a SCCP Connection Confirmation message to SGSN. RNC can directly send a MBMS RAB Assignment Response message which is a RANAP message to SGSN, or make the MBMS RAB Assignment Response message to be included in the data field of the SCCP Connection Confirmation message. MBMS RAB Assignment Response is a connection oriented message:

408 Establish a RRC connection for the UE in idle state.

409 UE sends a MBMS Service Request message to UTRAN.

410 RB is established for UE that receives MBMS service.

411 SGSN starts to send downlink data.

(2) The Signaling Flow of MBMS Dedicated Iu Connection Establishment

Figure 5:
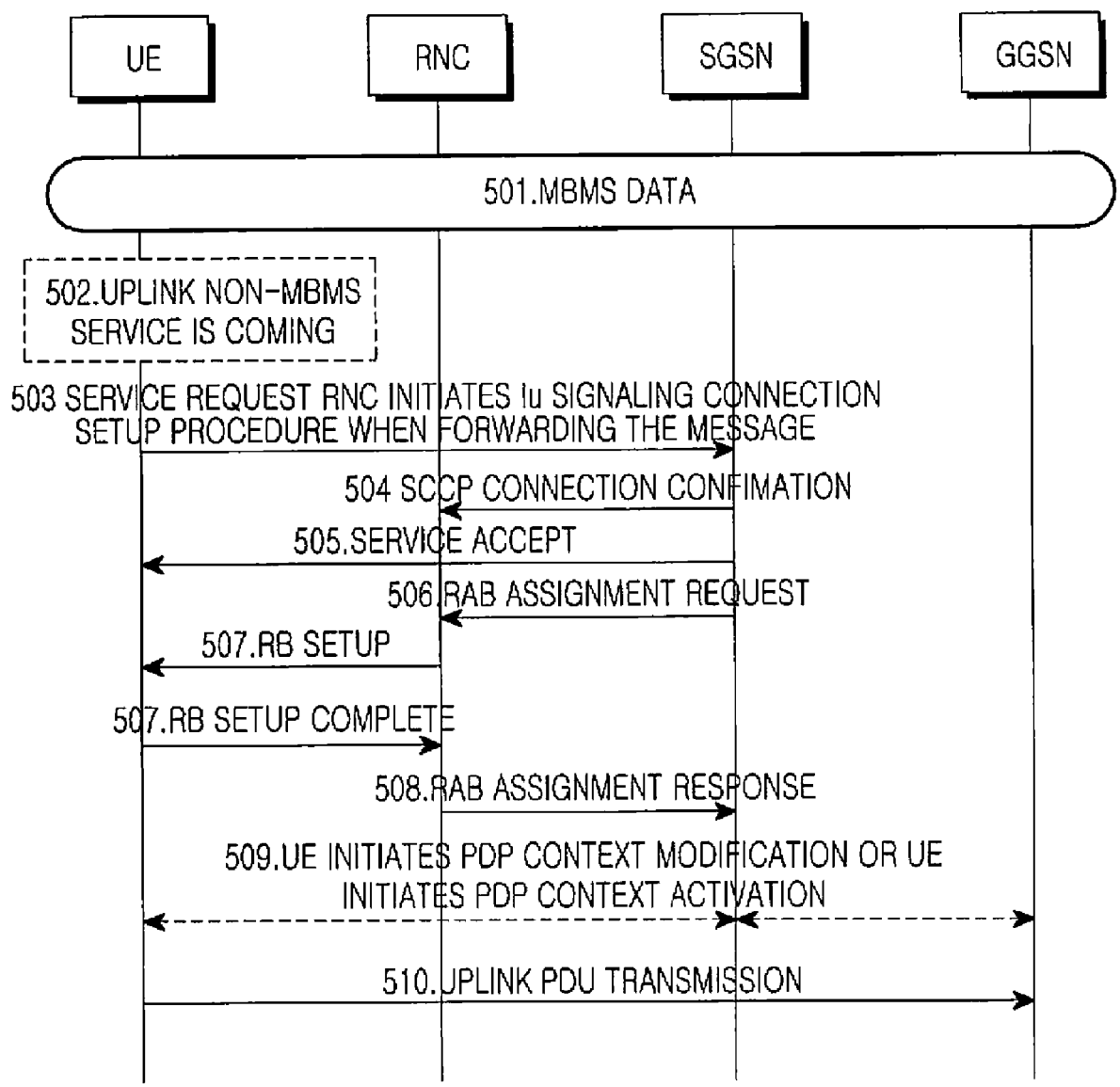
FIG. 5 shows the flow of establishing the dedicated Iu signaling connection for UE receiving MBMS data.

FIG. 5 describes the signaling flow for establishing dedicated Iu connection when UE needs to receive other services (e.g. voice) when receiving MBMS service. The description for each operation step is as follows.

501 MS receives MBMS service.

502 when there is uplink data for non-MBMS service needed to be sent, and if a RRC connection has been existed, MS can construct a Service Request message.

503 MS sends a Service Request message to SGSN and requests SGSN to preserve resources. The service type parameter of the Service Request message shall be set as data.

When RNC forwards a Service Request message of UE which is a non-MAC message to SGSN, if there is no Iu connection for this UE, RNC constructs a SCCP Connection Request message, initiates a Iu connection establishment procedure, and establishes a dedicated Iu connection for the UE.

504 After receiving the SCCP Connection Request message, SGSN saves the Iu connection ID allocated by RNC, allocates a identifier in SGSN for this connection, and sends a SCCP Connection Confirmation message to RNC.

505 If the service request is accepted, SGSN returns back a Service Acceptance message to MS.

506 SGSN sends a RAB Assignment Request message to RNC and requests to establish RAB.

507 RNC sends a RB Establishment message to MS, notifies MS to reestablished RAB ID, and requests to establish radio resources.

508 MS and RNC return a RB Establishment Completion message and a RAB Assignment Response message respectively, which indicate the completion of the bearer establishment on user plane.

509 For each re-established RAB according to modified QoS; SGSN initiates a PDP Context Modification procedure and notifies MS and GGSN of a newly-negotiated QoS corresponding to the PDP context.

510 MS sends uplink data packets.

(4) SRNS Relocation Procedure

Figure 6:
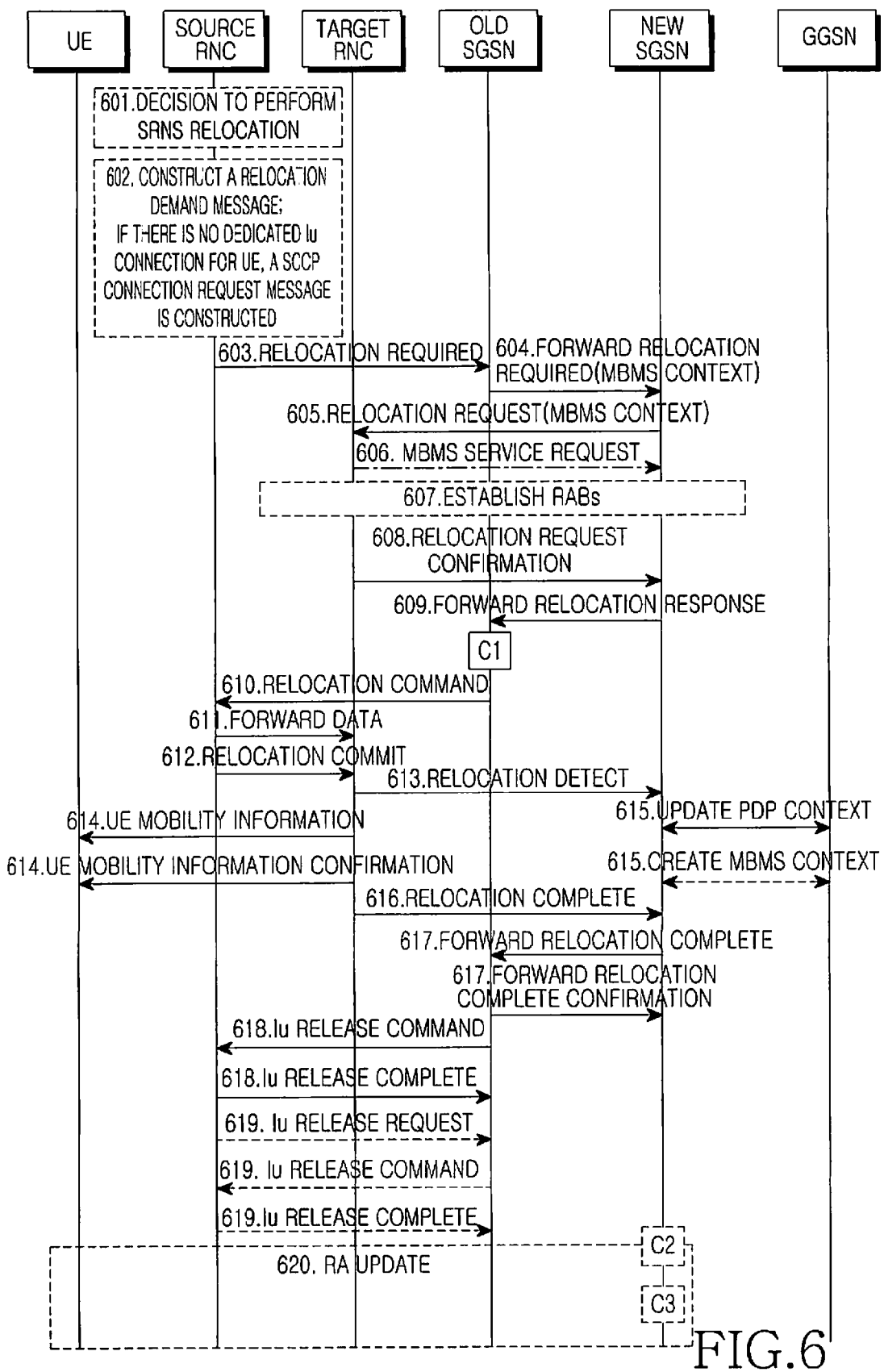
FIG. 6 shows the SRNC relocation procedure (wherein the release of shared Iu connection is method 1)
Figure 7:
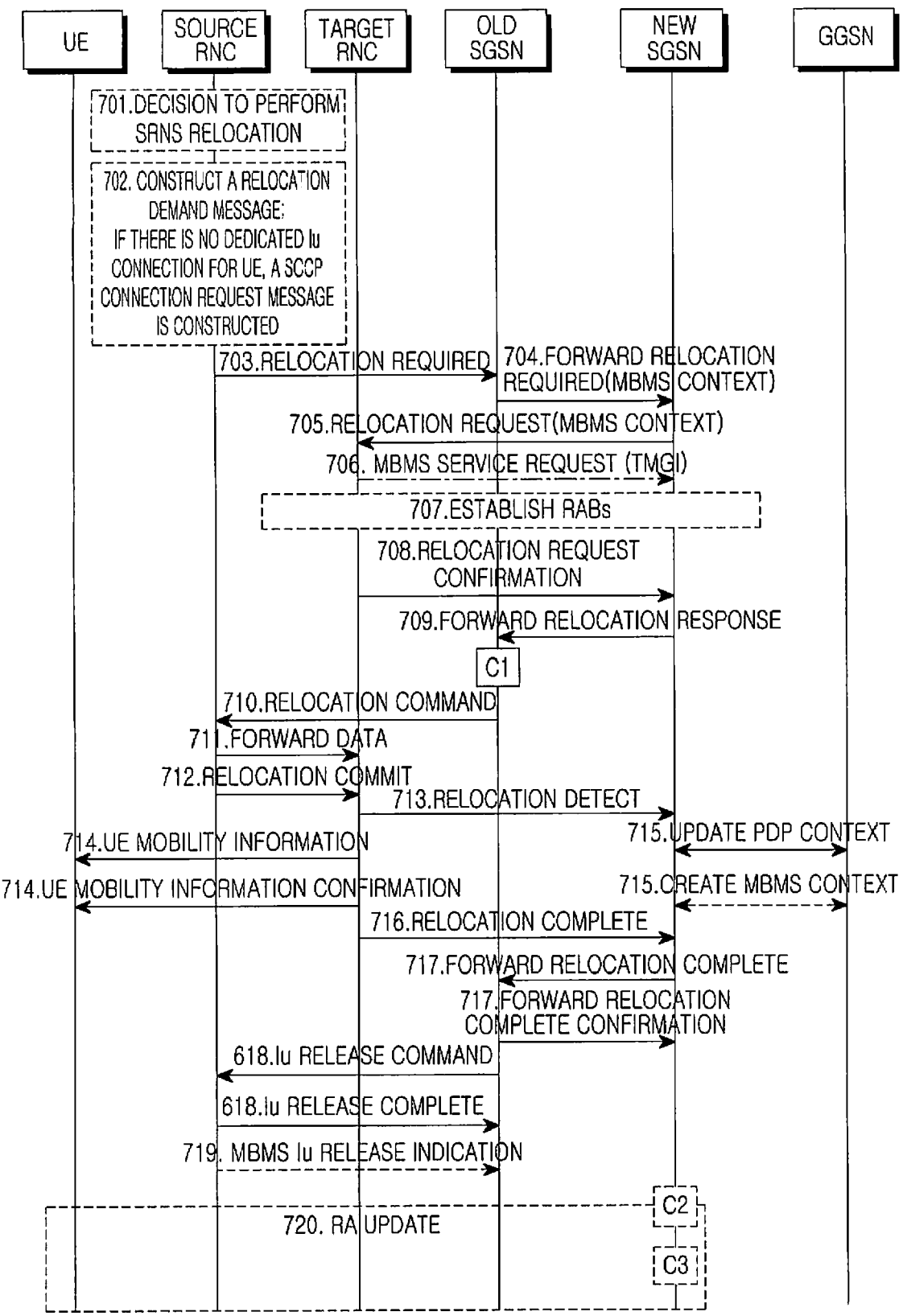
FIG. 7 shows the SRNC relocation procedure (wherein the release of shared Iu connection is method 2)
Figure 8:
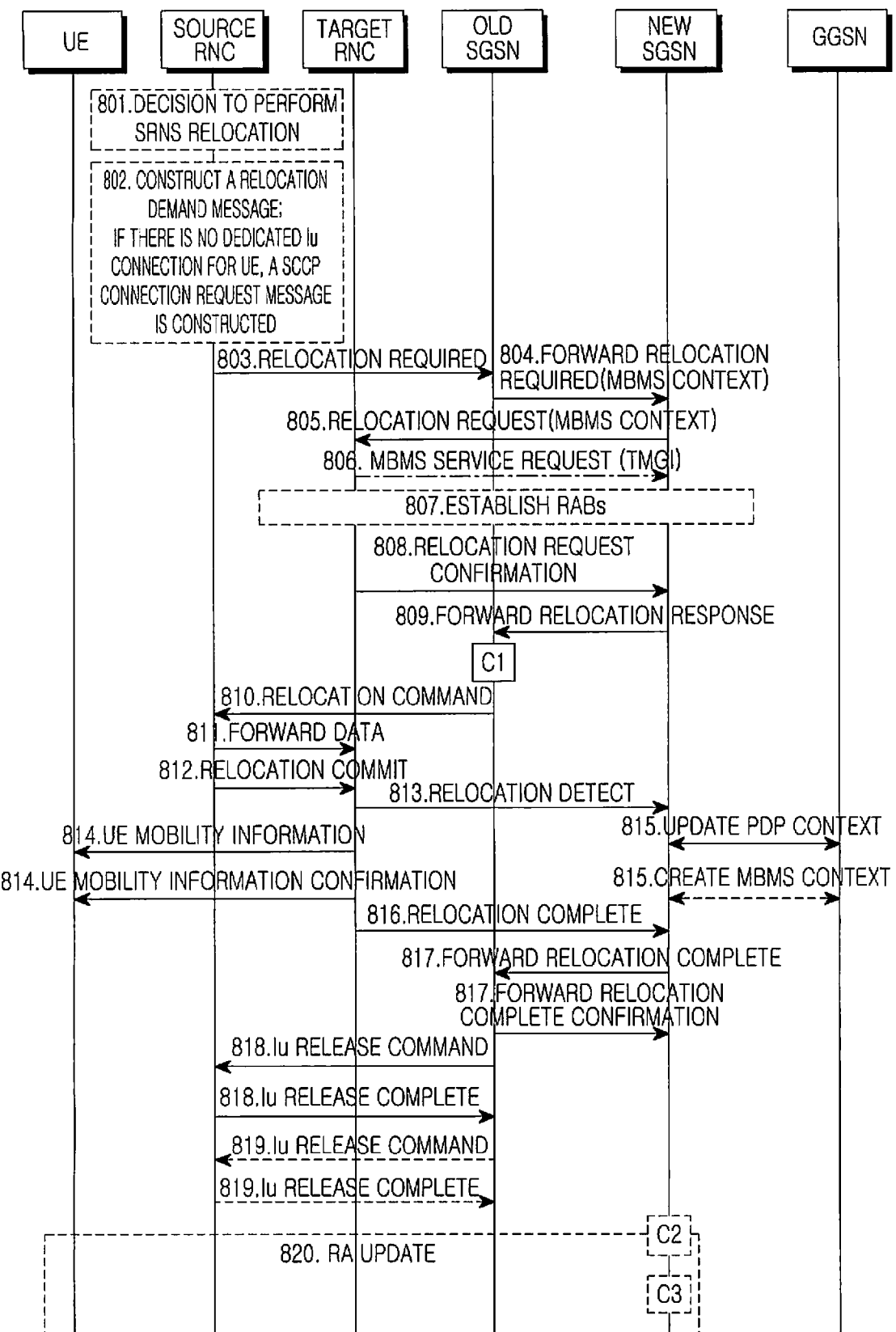
FIG. 8 shows the SRNC relocation procedure (wherein the release of shared Iu connection is method 3).

FIG. 6, FIG. 7 and FIG. 8 describe the SRNS relocation procedure when IBMS service is added and the signaling connection mode on Iu interface according to this invention is adopted. The difference among FIG. 6, FIG. 7 and FIG. 8 exists in that the messages used for releasing the shared Iu connection are different, the message corresponding to three schemes of the invention. Compared to the existing SRNS relocation procedure, it solves:

the problem of how to send a Relocation Demand message when user only receives MBMS service;
  If there is no corresponding service added in the target RNC, the corresponding message is added to the flow;
  If due to the moving of UE, there is no UE that is using MBMS service in the source RNC, the shared connection and user plane resources shall be released.

The detailed description for each step is as follows.

601 Source RNC decides to execute a SRNS relocation procedure;

602 and 603: The source RNC constructs a Relocation Demand message, and if a Iu connection dedicated for UE exists, and the message is directly sent to SGSN. If UE receives no services other than MBMS service and thus no Iu connection dedicated for the UE is available, RNC constructs a SCCP Connection Request message which includes a Relocation Demand message in its data field. RNC sends the SCCP Connection Request message to CN.

604 The old SGSN forwards the Relocation Request message which includes MBMS Context to the new SGSN.

605 The new SGSN sends a Relocation Request message to the target RNC, and establishes a dedicated Iu connection for UE during the 'sending of the Relocation Request message.

606 If the target RNC hasn't joined corresponding service, it sends a MBMS Service Request message to SGSN.

607 Radio access bearer, which includes RABs of MBMS, is established between the target RNC and the new SGSN.

608 After the resources needed by RAB, which include resources on the user plane, are successfully allocated, the target RNC sends a Relocation Request Confirmation message to the new SGSN.

609 The new SGSN forwards the Relocation Response message to the old SGSN.

610 The old SGSN sends a Relocation Command message to the source RNC.

611 The source RNC starts to copy data and sends them to the target RNC through network protocol (hereinafter referred to as IP layer).

612 The source RNC sends a Relocation Delivery message to the target RNC. This procedure is used to transmit SRNS Context to the target RNC, and the role of SRNS is converted from the source RNC to the target RNC.

613 When the target RNC receives the trigger message for relocation execution, it sends a Relocation Detecting message to the new SGSN. After that, the target RNC starts to play the role of Serving Radio Network Controller (hereinafter referred to as SRNC).

614 UE exchanges information on the mobility such as the new SRNC Identifier, the indication of location area and uplink user data, etc. with the target RNC 615 If the SRNS relocation is a relocation occurring between different SGSNs, and when the new SGSN receives a Relocation Detecting message, it sends a Update Packet Data Protocol (hereinafter referred to as PDP) Context Request message to the corresponding GGSN. GGSN updates PDP context and returns back an Update PDP Context Response message. The new SGSN examines each MBMS service in MBMS Context for the UE. IF a certain service is joined by the first UE in SGSN, a GTP tunnel is established between SGSN and GGSN, and MBMS Context is created in GGSN.

616 The target SRNC initiates a Relocation completion procedure after receiving a UTRAN Mobility Information Confirmation message.

617 The new SGSN sends a Relocation completion message to notify the old SGSN of the completion of SRNS relocation procedure, and the old SGSN returns a Relocation completion Confirmation message.

618 The Iu connection between source RNC and source SGSN and the user resources are released. If UE is receiving no services other than MBMS service, it only needs to release the temporary Iu connection dedicated for the UE.

619 If the UE is the last one that uses MBMS service in the source RNC, the shared connection and user plane resources for the MBMS service shall be released. RNC sends a Iu Release Request message to SGSN and requests SGSN to release the corresponding Iu connection and user plane resources; SGSN sends a Iu Release Command message to the source RNC; The source RNC releases the corresponding resources and sends a Iu Release completion message to SGSN.

If the UE is the last user of multiple the services in the source RNC, the above release procedure will be performed for multiple times.

620 If the new Route Area Indication (hereinafter referred to as RAI) is different from the old, UE initiates a route location update procedure.

Each operation step except for 719 in FIG. 7 is the same as that in FIG. 5.

719 If the UE is the last one that uses MBMS service in the source RNC, the shared connection and user plane resources corresponding to the MBMS service shall be released. RNC releases the user plane resources and Iu connection, and then sends a MBMS Iu Release Indication message to the old SGSN. This message includes information on released RAB.

If the UE is the last user of multiple MBMS services in the source RNC, the above release procedure will be performed for multiple times.

Each operation step except for 819 in FIG. 8 is the same as that in FIG. 5.

819 If SGSN finds that the last UE that uses the MBMS service leaves or quits between it and RNC, it sends a Iu Release Command to RNC.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of sharing a signaling bearer connection on an Iu interface for a Multimedia Broadcast Multicast Service (MBMS), where a Radio Network Controller (RNC) establishes a shared signaling bearer for MBMS service on the Iu interface, comprising:
    (a) receiving, by the RNC, an MBMS Notification message for an MBMS service, from a Service General Packet Radio Service (GPRS) Supporting Node (SGSN);
    (b) constructing, by the RNC, Signaling Connection Control Part (SCCP) Connection Request message according to the contents of the notification message;
    (c) sending, by the RNC, the SCCP Connection Request message to the SGSN, to request establish establishment of an SCCP signaling connection; and
    (d) receiving, by the RNC, an SCCP Connection Confirmation message from the SGSN, which indicates that a shared Iu signaling connection has been successfully established for the MBMS service.

2. The method as claimed in claim 1, wherein step (c) further comprises sending, by the RNC, the MBMS Service Request message, and if there is no corresponding Iu signaling connection for the MBMS service, initiating, by the RNC, an SCCP connection establishment procedure.

3. The method as claimed in claim 1, wherein when a UE has relocated or needs to receive a non-MBMS service, the RNC establishes a dedicated Iu signaling connection for the UE by performing the following steps:
    (a) executing a relocation procedure;
    (b) constructing a Relocation Demand message and checking whether there is an Iu signaling connection for this UE, and if there is no Iu signaling connection for the UE, constructing an SCCP Connection Request message which includes a Relocation Demand message in its data field;
    (c) sending an SCCP Connection Request message to the SGSN, requesting to establish an SCCP signaling connection, and then waiting for a reply; and
    (d) receiving an SCCP Connection Confirmation message from the SGSN, which indicates tat the shared Iu signaling connection has been successfully established for the MBMS service.

4. The method as claimed in claim 1, wherein when a UE has relocated or needs to receive a non-MBMS service, the SGSN establishes a dedicated Iu signaling connection for the UE by performing the following steps:
    (a) after receiving the SCCP Connection Request message from the RNC, separating a Radio Access Network Application Part (RANAP) message included in the data fields from the SCCP Connection Request message, and if the RANAP message is a Relocation Demand message, saving the Iu signaling connection ID allocated by the RNC for this UE, allocating an identifier of the signaling connection in the SGSN, and constructing the SCCP Connection Confirmation message;
    (b) sending the SCCP Connection Confirmation message to the RNC;
    (c) sending a Relocation Request message to a new SGSN; and
    (d) sending, after receiving a Relocation Response message from the new SGSN, a Relocation Command message to the RNC via the dedicated Iu signaling connection for the UE.

5. The method as claimed in claim 1, wherein when a UE has relocated or needs to receive a non-MBMS service, the RNC establishes a dedicated Iu signaling connection for the UE, by performing the following steps:
    when the RNC receives a non Media Access Control (non-MAC) Service Request message from a UE, examining whether there is a dedicated Iu signaling connection for the UE, and if there is no dedicated Iu signaling connection for the UE, constructing an SCCP Connection Request message and initiating the SCCP connection establishment procedure while forwarding the Service Request message to the SGSN wherein the RNC sends the SCCP Connection Request message to the SGSN,
    wherein the dedicated Iu signaling connection for the UE has been successfully established when the RNC receives an SCCP Connection Confirmation message from the SGSN.

6. The method as claimed in claim 1, wherein when a UE has relocated or needs to receive a non-MBMS service, the SGSN establishes a dedicated Iu signaling connection for the UE, by performing the following steps:
    (a) after receiving an SCCP Connection Request message from the RNC, separating a Radio Access Network Application Part (RANAP) message included in the data fields from the SCCP Connection Request message, and if the RANAP message is a Service Request message, saving an Iu signaling connection identifier allocated by the RNC for this UE, allocating the identifier of the signaling connection in the SGSN, and constructing the SCCP Connection Confirmation message;
    (b) sending the SCCP Connection Confirmation message to the RNC; and
    (c) if the service request is accepted, returning a Service Acceptance message to the UE and sending an Establish Radio Access Bearer (RAB) message via this dedicated Iu signaling connection.

7. The method as claimed in claim 3, wherein if a target RNC is not incorporated with an MBMS service necessary for the UE after the UE receives a Relocation Request message, the target RNC sends an MBMS Service Request message to the SGSN, to establish an RAB for the MBMS service.

8. The method as claimed in claim 1, wherein the RNC initiates an Iu connection release procedure for the shared MBMS Iu signaling connection, when there is no UE using a certain MBMS service between the RNC and the SGSN.

9. The method as claimed in claim 1, wherein the SGSN initiates a release procedure for the shared MBMS Iu signaling connection,
    when the SGSN no longer receives MBMS data, and
    when an MBMS service between the RNC and the SGSN is not used by a UE.

10. A method of sharing a signaling bearer connection on an Iu interface for a Multimedia Broadcast Multicast Service (MBMS), where a Service General Packet Radio Service (GPRS) Supporting Node (SGSN) establishes a shared signaling bearer for the MBMS service, the method comprising:

(a) sending, by the SGSN, an MBMS Notification message to a Radio Network Controller (RNC) after receiving data sent from a Gateway General Packet Radio Service (GPRS) Supporting Node (GGSN), notifying of relevant MBMS service information, and then waiting for a response message from the RNC;

(b) after receiving a Signaling Connection Control Part (SCCP) Connection Request message from the RNC, separating, by the SGSN, a Radio Access Network Application Part (RANAP) message included in the data fields from the SCCP connection Request message and saving an Iu signaling connection identifier allocated by the RNC for the MBMS service, allocating the identifier of the signaling connection in the SGSN, and constructing a Signaling Connection Control Part (SCCP) Connection Confirmation message and an MBMS Radio Access Bearer (RAB) Assignment Request message;

(c) sending, by the SGSN, the SCCP Connection Confirmation message to the RNC; and (d) sending, by the SGSN, the MBMS RAB Assignment Request message to the RNC via a shared Iu signaling connection, if the MBMS RAB Assignment Request message is included in the data field of the SCCP Connection Confirmation message.

11. The method as claimed in claim 10, wherein when a UE has relocated or needs to receive a non-MBMS service, the RNC establishes a dedicated Iu signaling connection for the UE by performing the following steps:

(a) after determining to execute a relocation procedure, constructing a Relocation Demand message and checking whether there is an Iu signaling connection for the UE, and if there is no Iu signaling connection for the UE, constructing an SCCP Connection Request message, which includes a Relocation Demand message in its data field;

(b) sending the SCCP Connection Request message to the SGSN, requesting to establish an SCCP signaling connection; and (c) receiving the SCCP Connection Confirmation message from the SGSN, which indicates that the shared Iu signaling connection has been successfully established for the MBMS service.

12. The method as claimed in claim 10, wherein when a UE has relocated or needs to receive a non-MBMS service, the SGSN establishes a dedicated Iu signaling connection for the UE by performing the following steps:

(a) after receiving the SCCP Connection Request message from the RNC, separating the RANAP message included in the data fields from the SCCP Connection Request message, and when the RANAP message is a Relocation Demand message, saving the Iu signaling connection identifier, allocating the identifier of the signaling connection in SGSN, and constructing the SCCP Connection Confirmation message;

(b) sending the SCCP Connection Confirmation message to the RNC;

(c) sending a Relocation Request message to the new SGSN; and (d) after receiving a Relocation Response message from the new SGSN, sending a Relocation Command message to the RNC via the dedicated Iu signaling connection for the UE.

13. The method as claimed in claim 10, wherein when a UE has relocated or needs to receive a non-MBMS service, the RNC establishes a dedicated Iu signaling connection for the UE by performing the following:

determining, when the RNC receives a non Media Access Control (non-MAC) Service Request message from the UE, whether there is a dedicated Iu sianaling connection for the UE, and if there is no dedicated Iu signaling connection for the UE, constructing an SCCP Connection Request message, initiating an SCCP connection establishment procedure while forwarding the Service Request message to the SGSN, and sending the SCCP Connection Request message to the SGSN, wherein the dedicated Iu signaling connection for the UE has been successfully established when the RNC receives the SCCP Connection Confirmation message from the SGSN.

14. The method as claimed in claim 10, wherein when a UE has relocated or needs to receive a non-MBMS service, the SGSN establishes a dedicated Iu signaling connection for the UE by performing the following steps:

(a) separating, after receiving the SCCP Connection Request message from the RNC, the RANAP message included in the data fields from the SCCP Connection Request message, and when the RANAP message is a Service Request message, saving the Iu signaling connection identifier allocating the identifier of the signaling connection in the SGSN, and constructing the SCCP Connection Confirmation message;

(b) sending the SCCP Connection Confirmation message to the RNC; and (c) returning, if the service request is accepted, a Service Acceptance message to the UE and sending an Establish RAB message via the dedicated Iu signaling connection.

15. The method as claimed in claim 10, wherein if a target RNC is not incorporated with an MBMS service necessary for the UE after the UE receives a Relocation Request message, the target RNC sends an MBMS Service Request message to the SGSN to establish the RAB for the MBMS service.

16. The method as claimed in claim 10, wherein the RNC initiates an Iu connection release procedure for the shared MBMS Iu signaling connection, when there is no UE using an MBMS service between the RNC and the SGSN.

17. The method as claimed in claim 10, wherein the SGSN initiates a release procedure for the shared MBMS Iu signaling connection, when the SGSN no longer receives MBMS data and when an MBMS service between the RNC and the SGSN is not used by a UE.

18. A method of sharing a signaling bearer connection on an Iu interface for a Multimedia Broadcast Multicast Service (MBMS), where a Service General Packet Radio Service (GPRS) Supporting Node (SGSN) establishes a shared signaling bearer for the MBMS service on the Iu interface, the method comprising the steps of:

(a) receiving, by the SGSN, MBMS data from a Gateway General Packet Radio Service (GPRS) Supporting Node (GGSN);

(b) analyzing, by the SGSN, the MBMS service, and organizing a Signaling Connection Control Part (SCCP) Connection Request message including an MBMS Radio Access Bearer (RAB) Assignment Request message in its data field if there is no shared Iu signaling connection used for this service;

(c) sending, by the SGSN, SCCP Connection Request message to a Radio Network Controller (RNC), requesting to establish an SCCP signaling connection; and (d) receiving, SGSN, an SCCP Connection Confirmation message from the RNC, which indicates that the shared Iu signaling connection has been successfully established for the MBMS service.

19. The method as claimed in claim 18, wherein step (c) further comprises sending, by the SGSN, the MBMS RAB Assignment Request message, and if there is no Iu signaling connection corresponding to the MBMS service, initiating, by the SGSN, an SCCP connection establishment procedure, wherein a Radio Access Network Application Part (RANAP) message is included in the data field of the SCCP Connection Request message.

20. The method as claimed in claim 18, wherein when a UE has relocated or needs to receive a non-MBMS service, the RNC establishes a dedicated Iu signaling connection for the UE by performing the following steps:
  (a) atfer determining to execute a relocation procedure, constructing a Relocation Demand message and determining whether there is an Iu signaling connection for the UE, and if there is no Iu signaling connection for the UE, constructing the SCCP Connection Request message, which includes a Relocation Demand message in its data field;
  (b) sending the SCCP Connection Request message to the SGSN, requesting to establish the SCCP signaling connection; and
  (c) receiving the SCCP Connection Confirmation message from the SGSN, which indicates that the shared Iu signaling connection has been successfully established for the MBMS service.

21. The method as claimed in claim 18, wherein when a UE has relocated or needs to receive a non MBMS service, the SGSN establishes a dedicated Iu signaling connection for the UE by performing the following steps:
  after receiving the SCCP Connection Request message from RNC, separating a Radio Access Network Application Part (RANAP) message included in the data field from the SCCP Connection Request message, and if the RANAP message is a Relocation Demand message, saving the Iu signaling connection identifier allocated by the RNC for the MBMS service, allocating the identifier of the signaling connection in the SGSN, and constructing the SCCP Connection Confirmation message;
  sending the SCCP Connection Confirmation message to the RNC;
  sending a Relocation Request message to a new SGSN; and
  after receiving a Relocation Response message from the new SGSN, sending a Relocation Command message to the RNC via the dedicated Iu signaling connection for the UE.

22. The method as claimed in claim 18, wherein when a UE has relocated or needs to receive a non-MBMS service, the RNC establishes a dedicated Iu signaling connection for the UE by performing the following:
  receiving a non Media Access Control (non-MAC) Service Request message from the UE and checking whether there is a dedicated Iu signaling connection for the UE, and if there is no dedicated Iu signaling connection for the UE, constructing the SCCP Connection Request message and initiating an SCCP connection establishment procedure while forwarding the Service Request message to the SGSN, and sending the SCCP Connection Request message to the SGSN, wherein the dedicated Iu signaling connection for the UE has been successfully established when the RNC receives the SCCP Connection Confirmation message from the SGSN.

23. The method as claimed in claim 18, wherein when a UE has relocated or needs to receive a non-MBMS service, the SGSN establishes a dedicated Iu signaling connection for the UE by performing the following:
  after receiving the SCCP Connection Request message from the RNC, separating the Radio Access Network Application Part (RANAP) message included in the data field from the SCCP Connection Request message, and when the RANAP message is a Service Request message, saving the Iu signaling connection identifier allocated by RNC for the MBMS service, allocating the identifier of the signaling connection in the SGSN, and constructing the SCCP Connection Confirmation message and sending the SCCP Connection Confirmation message to the RNC, wherein the SGSN returns a Service Acceptance message to the UE and sends an Establish RAB message via the dedicated connection, when the service request is accepted.

24. The method as claimed in claim 18, wherein for the shared MBMS Iu signaling connection, when there is no UE using an MBMS service between the RNC and the SGSN, the RNC initiates an Iu connection release procedure.

25. The method as claimed in claim 18, wherein for the shared MBMS Iu signaling connection, the SGSN initiates a release procedure when the SGSN no longer receives MBMS data, and when an MBMS service between the RNC and the SGSN is not used by a UE.

26. A method of sharing a signaling bearer connection established by a Radio Network Controller (RNC) on an Iu interface for a Multimedia Broadcast Multicast Service (MBMS) service, the method comprising:
  (a) after receiving signaling Connection Control Part (SCCP) Connection Request message from a Service General Packet Radio Service (GPRS) Supporting Node (SGSN), separating, by the RNC, a Radio Access Network Application Part (RANAP) message included in the data fields of the SCCP Connection Request message and saving an Iu signaling connection identifier allocated by SGSN for the MBMS service;
  (b) allocating the identifier of the signaling connection in the RNC and constructing an SCCP Connection Confirmation message and an MBMS Radio Access Bearer (RAB) Assignment Response message;
  (c) sending, by the RNC, the SCCP Connection Confirmation message to the SGSN; and
  (d) sending, by the RNC, the MBMS RAB Assignment Response message to the SGSN via a shared Iu signaling connection.

27. The method as claimed in claim 26, wherein when a UE has relocated or needs to receive a non-MBMS service, the RNC establishes a dedicated Iu signaling connection for the UE by performing the following steps:
  (a) determining to execute a relocation procedure;
  (b) constructing a Relocation Demand message and checking whether there is an Iu signaling connection for the UE, if there is no Iu signaling connection for the UE, constructing the SCCP Connection Request message, which includes a Relocation Demand message in its data field;
  (c) sending the SCCP Connection Request message to the SGSN, requesting to establish the SCCP signaling connection; and
  (d) receiving the SCCP Connection Confirmation message from the SGSN, which indicates tat the shared Iu signaling connection has been successfully established for the MBMS service.

28. The method as claimed in claim 26, wherein when a UE has relocated or needs to receive a non-MBMS service, the SGSN establishes a dedicated Iu signaling connection for the UE by performing the following steps:

(a) after receiving the SCCP Connection Request message from the RNC, separating the RANAP message included in the data field from the SCCP Connection Request message, and when the RANAP message is a Relocation Demand message, saving the Iu signaling connection identifier allocated by RNC for the MBMS service, allocating the identifier of the signaling connection in the SGSN, and constructing the SCCP Connection Confirmation message;

(b) sending the SCCP Connection Confirmation message to the RNC;

(c) sending a Relocation Request message to a new SGSN; and (d) after receiving a Relocation Response message from the new SGSN, sending a Relocation Command message to the RNC via the dedicated Iu signaling connection for the UE.

29. The method as claimed in claim 28, wherein when the RNC sends an MBMS Service Demand message, if there is no corresponding Iu signaling connection for the MBMS service, the RNC initiates an SCCP connection establishment procedure, wherein the RANAP message is included in the data field of the SCCP Connection Request message.

30. The method as claimed in claim 26, wherein when a UE has relocated or needs to receive a non-MBMS service, the RNC establishes a dedicated Iu signaling connection for the UE by performing the following:

determining, when RNC receives a non Media Access Control (non-MAC) Service Request message from the UE, whether there is a dedicated Iu signaling connection for the UE, and if there is no dedicated Iu signaling connection for the UE, constructing the SCCP Connection Request message and initiating an SCCP connection establishment procedure while forwarding the Service Request message to the SGSN, and sending the SCCP Connection Request message to the SGSN, wherein the dedicated Lu signaling connection for the UE has been successfully established when the RNC receives the SCCP Connection Confirmation message from the SGSN.

31. The method as claimed in claim 26, wherein when a UE has relocated or needs to receive a non-MBMS service, the SGSN establishes a dedicated Iu signaling connection for the UE by performing the following:

after receiving the SCCP Connection Request message from the RNC, separating the RANAP message included in the data field from the SCCP Connection Request message, and when the RANAP message is a Relocation Request message, saving the Iu signaling connection identifier allocated by the RNC for the MBMS service, allocating the identifier of the signaling connection in the SGSN, and constructing the SCCP Connection Confirmation message; and sending the SCCP Connection Confirmation message to the RNC, wherein the SGSN returns a Service Acceptance message to the UE and sends an Establish RAB message via the dedicated Iu signaling connection.

32. The method as claimed in claim 27, wherein if the RNC determines that a user of the UE is a last user for an MBMS service between the RNC and the SGSN and that the shared Iu signaling connection for the MBMS service also exists, the RNC initiates a procedure of releasing the shared Iu signaling connection and resources on a user plane.

33. The method as claimed in claim 32, wherein the release procedure includes:

sending, by the RNC, an Iu Release Request message to the SGSN to requests a release of the shared Iu signaling connection and the resources on the user plane;

sending, by the SGSN, an Iu Release Command message to the RNC, after receiving the Iu Release Request message from the RNC; and releasing, by the RNC, the corresponding resources and sending an Iu Release Completion message to the SGSN, after receiving the Iu Release Command message from the SGSN, wherein the release procedure is executed a plurality of times when the UE is the last user of multiple services in the RNC.

34. The method as claimed in claim 32, wherein the release procedure is initiated by the RNC when the RNC determines that the last UE that uses the MBMS service has left the service, and the RNC releases the user plane resources and Iu signaling connection and sends an MBMS Iu Release Indication message to the previous SGSN.

35. The method as claimed in claim 34, wherein the MBMS Iu Release Indication message is a connection-oriented message, and the message includes an RAB Data Volume Report List and a released RABs list.

36. The method as claimed in claim 27, wherein when the SGSN determines that the last UE that uses the MBMS service between the SGSN and the RNC has left the service and a shared Iu signaling connection still exists for the MBMS service, the SGSN initiates a release procedure of the shared Iu signaling connection, the SGSN re-sends an Iu Release Command message to the RNC and requests to release the shared Iu signaling connection and resources on a user plane, and after receiving the Iu Release Command message, the RNC releases the corresponding resources and sends an Iu Release Completion message to SGSN;

wherein the release procedure is executed a plurality of times when the UE is the last user of multiples service in the RNC.

37. The method as claimed in claim 26, wherein for the shared MBMS Iu signaling connection, when there is no UE using the MBMS service between the RNC and the SGSN, the RNC initiates an Iu connection release procedure.

38. The method as claimed in claim 26, wherein for the shared MBMS Iu signaling connection, the SGSN initiates a release procedure when the SGSN no longer receives MBMS data, and when an MBMS service between the RNC and the SGSN is not used by a UE.

* * * * *

UNITED STATES PATENT AND TRADEMARK OFFICE
CERTIFICATE OF CORRECTION

PATENT NO. : 7,664,503 B2
APPLICATION NO. : 10/533690
DATED : February 16, 2010
INVENTOR(S) : Choi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1110 days.

Signed and Sealed this

Thirtieth Day of November, 2010

David J. Kappos
*Director of the United States Patent and Trademark Office*